United States Patent [19]

Eastcott et al.

[11] Patent Number: 5,535,877

[45] Date of Patent: Jul. 16, 1996

[54] GLYCOL CONCENTRATOR

[76] Inventors: Peter d. Eastcott, 531 Homewood Avenue; Nicole A. Truman; Peter Truman, both of 1514 Champlain Drive, all of Peterborough, Ontario, Canada, K9L 1N4

[21] Appl. No.: 203,038

[22] Filed: Feb. 28, 1994

[30] Foreign Application Priority Data

Sep. 23, 1993 [CA] Canada ................................ 2106358

[51] Int. Cl.$^6$ .............................. B01D 3/10; B01D 3/42
[52] U.S. Cl. .......................... 203/18; 159/16.1; 159/44; 159/47.1; 159/901; 159/DIG. 16; 202/158; 202/160; 202/205; 202/236; 202/267.1; 203/1; 203/2; 203/86; 203/49; 203/94; 203/98; 568/916
[58] Field of Search ............................ 203/18, 1, 2, 91, 203/86, 98, 94, 49, 89, 90, DIG. 1; 159/16.1, 901, 131, DIG. 16, DIG. 10, 49, 4.01, 44, 4.04, 47.1; 202/205, 158, 236, 267.1, 160; 73/32 R; 261/DIG. 72; 568/916

[56] References Cited

U.S. PATENT DOCUMENTS

| | | | |
|---|---|---|---|
| 3,398,061 | 8/1968 | Taul | 203/18 |
| 3,450,603 | 6/1969 | Meyers et al. | 203/18 |
| 3,480,513 | 11/1969 | Martin | 202/202 |
| 3,841,382 | 10/1974 | Gravis, III et al. | 159/16.1 |
| 3,860,492 | 1/1975 | Lowi, Jr. et al. | 159/13.1 |
| 4,010,065 | 3/1977 | Alleman | 159/4.04 |
| 4,171,620 | 10/1979 | Turner | 230/18 |
| 4,179,328 | 12/1979 | Barra et al. | 203/18 |
| 4,182,659 | 1/1980 | Anwer et al. | 203/18 |
| 4,322,265 | 3/1982 | Wood | 159/47.3 |
| 4,332,643 | 6/1982 | Reid | 203/18 |
| 4,930,322 | 6/1990 | Ashley et al. | 62/92 |
| 4,978,430 | 12/1990 | Nakagawa et al. | 203/14 |
| 5,090,972 | 2/1992 | Eller et al. | 95/15 |
| 5,207,869 | 5/1993 | Harmoning et al. | 159/16.1 |
| 5,262,013 | 11/1993 | Beal et al. | 203/18 |

FOREIGN PATENT DOCUMENTS

| | | |
|---|---|---|
| 807953 | 3/1969 | Canada . |
| 976866 | 10/1975 | Canada . |
| 1005746 | 2/1977 | Canada . |

*Primary Examiner*—Virginia Manoharan

[57] ABSTRACT

A method and apparatus for removing water from a solution of water and glycol solution. The apparatus finds application in recycling of glycol wherein a water and glycol solution having as much as a 95% water content when introduced to the apparatus leaves the apparatus with a water content in the order of 40% to 60%. The glycol concentrator has a packing medium made from glass shards that provide a labyrinth through which air is circulated in one direction and thin streams of glycol are circulated in generally the opposite direction. It is believed that mixing of the thin streams of solution and air flow steams in the labyrinth results in a thin film evaporation process. The glycol concentrator apparatus has reduced energy requirements when compared with a distilling process.

16 Claims, 2 Drawing Sheets

GLYCOL CONCENTRATOR

FIELD OF THE INVENTION

The present invention relates to the removal of water from a solution of water and glycol. In particular it relates to a relatively energy efficient system for removing water from a water and glycol solution where the initial weight percent ratio of water to glycol in the solution may be as high as 95% water to 5% glycol.

BACKGROUND OF THE INVENTION

For several years glycol has been used by airports around the world to de-ice the wings of aircraft prior to take-off during poor winter weather conditions. In recent years, the presence of glycol contamination in the ground water table surrounding airports has been discovered. Since the discovery, new controls and regulations have been introduced whereby aircraft are sprayed with glycol at de-icing stations and the sprayed aircraft then taxi for priority take-off. At these stations, glycol that drips off the aircraft is collected along with water melted in the de-icing from freezing rain or snow that may be falling due to poor weather conditions. Since glycol forms a miscible solution with water, the solutions collected may have water contents as high as 95% water to 5% glycol. Currently, the collected solution is removed from the de-icing station for waste management treatment which can involve distillation of the water from the glycol to recover the glycol.

Distillation of water from a water and glycol solution is the most common method used to remove water from a solution of water and glycol. Such distillation systems are used in natural gas treatment systems where the glycol is used to treat natural gas to remove water from natural gas and then the water and glycol solution is distilled by a variety of heating methods to remove the water from the glycol. In such systems the water content in the water and glycol solution is usually well below 10% and the distilled solution ends up being in the order of 99% or better glycol. Examples of these natural gas water removal and subsequent water distillation systems are disclosed in U.S. Pat. Nos. 4,332,643 issued Jun. 1, 1982 to Laurence S. Reid; 4,322,265 issued Mar. 30, 1982 to Harold S. Wood; 4,010,065 issued Mar. 1, 1977 to Carl E. Alleman; 3,841,382 issued Oct. 15, 1974 to Charles K. Gravis, III et al; 3,450,603 issued Jun. 17, 1969 to Charles O. Meyers et al; and, Canadian Patent 807,953 issued Mar. 11, 1969 to Clifford W. Barnhart.

It is also known to purify glycol contaminated by oxidation products by adding small amounts of water and distilling off the water under partial vacuum. Such a method is disclosed in U.S. Pat. No. 3,398,061 issued to Horst Taul et al.

It should be understood that the above methods of distillation involve the use of heat to vaporize the water in glycol solutions having less than 10% initial water content. There is no teaching of using distillation methods to remove water from a glycol and water solution having as much as 95% water content.

It is also known to provide evaporation towers in which human waste, corrosive solutions and saline water are purified by heated packing mediums within the towers. Such evaporation towers are disclosed in U.S. Pat. No. 5,207,869 issued May 4, 1993 to H. David Harmoning et al; Canadian Patent 1,005,746 issued Feb. 22, 1977 to Roger Rat et al; and Canadian Patent 976,866 issued to Melvin H. Brown. However, the application of these evaporation towers is not relevant to the removal of relatively high initial concentrations of water from a water and glycol solution.

There is still a need for a relatively energy efficient apparatus for the removal of water from water and glycol solutions having high initial concentrations of water so that ultimately a reusable water and glycol solution may be obtained.

SUMMARY OF THE INVENTION

In accordance with one aspect of the present invention there is provided a method of removing water from a solution of water and glycol. The method includes the step of circulating a plurality of thin streams of the water and glycol solution generally in a first direction through a packing medium arranged to have a labyrinth. The method further includes the step of circulating air generally in a second direction through the labyrinth of the packing medium over the thin streams of the glycol and water solution to selectively remove water from the solution, to increase relative humidity of the air passing through the labyrinth and to increase the glycol concentration in the water and glycol solution.

Throughout the specification and claims reference is made to glycol and a solution of water and glycol. By glycol it is meant alcohols having two hydroxyl groups attached to the carbon skeleton and, more specifically, ethylene glycol which is dihydroxy alcohol commonly used in antifreeze.

Additionally, the circulating solution step of the above described method may include the step of supplying the solution to the packing medium in the form of a plurality of discrete droplets of water and glycol solution.

From testing it has been determined that the method does not require the introduction of heat and may employ atmospheric air in the air circulating step. It is further contemplated that the first direction in which the solution is circulated through the packing medium is opposite to the second direction in which the air flows through the packing medium.

In accordance with another aspect of the present invention there is provided a glycol concentrator for increasing the concentration of glycol in water and glycol solution. The concentrator includes a tower, a water and glycol solution circulating system, and an air circulating system. The tower supports a packing medium having a labyrinth. The water and glycol solution circulating system includes a solution reservoir positioned below the packing medium, a drip pan supported above the packing medium and a circulating passage running from the reservoir to the drip pan for supplying the water and glycol solution from the reservoir to the drip pan. The drip pan has a plurality of openings though which discrete droplets of the water and glycol solution are distributed over the packing medium to flow in thin streams downwardly though the labyrinth of the packing medium and into the reservoir. The air circulating system circulates air into the reaction tower, through the labyrinth of the packing medium and out of the reaction tower. As the air passes over the thin streams of water and glycol solution in the labyrinth it selectively removes water from the solution and increases the glycol concentration of the solution returning to the reservoir.

It is envisaged that the concentrator may operate without a heat source in ambient weather conditions. The concentrator 10 may be located at ground level with a supply tank and a holding tank located underground. It is also envisaged that the top wall or roof of the concentrator may be transparent allowing the sun light to warm the inside of the tower during daylight hours. Any warming of the air in the tower increases the water absorption properties of the air circulating through the tower. Ambient temperature and humidity sensors may be used to shut the concentrator down when ambient temperatures fall below −35° C. or the relative humidity is above 95%.

Advantage is found in the present invention because of the concentrator's reduced power requirements when compared to a distilling process. It should be further understood that the concentrator has a relatively low energy consumption when compared to that of a distilling process. The concentrator is able to operate 24 hours a day except when it is shut down for cleaning purposes. It is envisaged that when the water to glycol ratio is in the range of 1:1 to 1:2, the solution will be removed from the reservoir for possible further processing depending on the intended use of the solution.

BRIEF DESCRIPTION OF THE DRAWINGS

For a better understanding of the nature and objects of the present invention reference may be had to the accompanying diagrammatic drawings in which.

DETAILED DESCRIPTION OF THE PREFERRED EMBODIMENT

Figure 1:
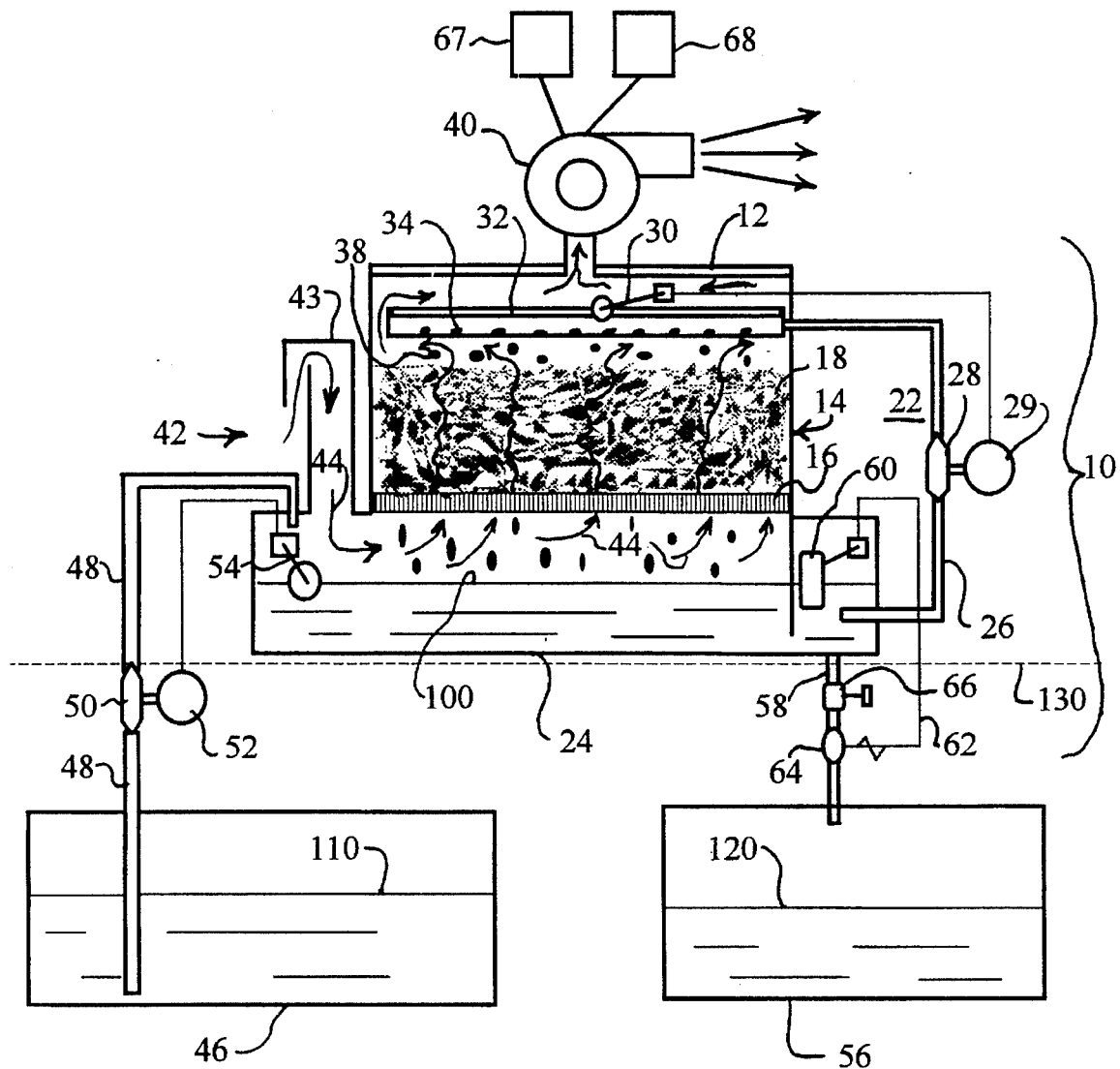
FIG. 1 is a diagrammatic illustration of a glycol concentrator in which the present invention is embodied.

Referring to FIG. 1 there is shown a glycol concentrator 10 embodying the present invention. It is envisaged that the concentrator 10 can be built as an outdoor station. The concentrator 10 has a tower 12 which supports a packing medium 14 on an expanded metal grid screen 16.

The packing medium 14 is preferably shards of glass 18 that are obtained from smashed recycled glass. As shown in more detail in FIG. 2, the shards of glass 18 provide a network of passages, or a labyrinth 20, through the packing medium 14. Shards of glass 18 are the preferred packing medium 14 because the packing characteristics of the shards of glass have provided the best results to date and the glass can be recycled. The glass shards or bed 18 should not be too fine because the finer the glass bed 18, i.e. the more tightly packed the glass shards, the greater the air pressure drop across the glass bed becomes which decreases the flow of solution and air through the packing medium. It should be understood that the shards of glass 16 may be obtained from other sources. Further, other materials may be used for the packing medium that are inert to the water and glycol solution, such as, for example, plastics or expanded metal wool.

Figure 3:
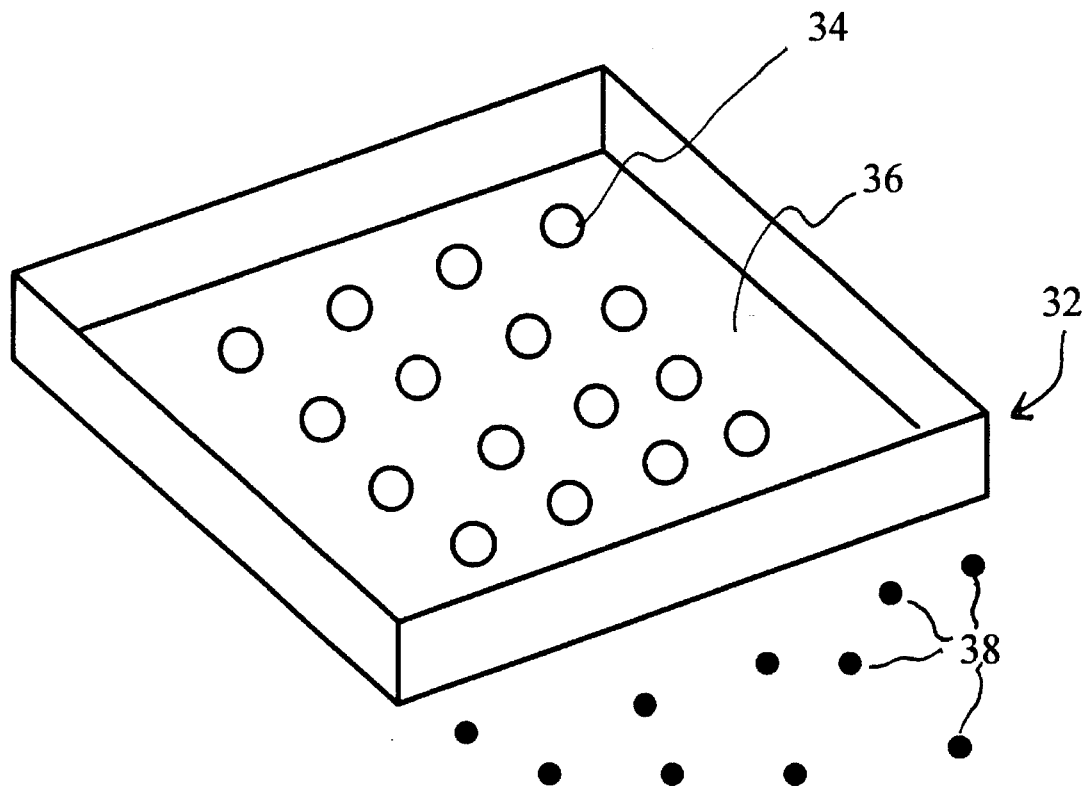

The concentrator 10 has a water and glycol solution circulating system 22. The solution circulating system 22 has a solution reservoir 24 positioned below the packing medium 14 and support screen 16. The solution circulating system has a circulating passage or piping 26, a flow pump 28 operated by a motor 29 (AC or DC) and an ON/OFF float switch 30. The motor 29 and pump 28 operate in ON and OFF conditions controlled by float switch 30 to control flow of solution from the reservoir 24 to a drip pan or headbox 32. The float switch 30 ensures that the pan 32 is not overfilled and is maintained at a predetermined solution level. Alternatively the motor 29 and pump 28 could operate as a variable speed pump with a modern modulating control. The drip pan 32 distributes the water and glycol solution over the packing medium 14. The drip pan 32, shown in more detail in FIG. 3, has openings 34 in its floor 36. The pattern, number and size of the openings 34 determines the distribution of the solution over the packing medium 14 and the size of droplets 38 of solution falling from the drip pan 32. The size of openings 34 should create discrete droplets 38 and not a fine mist that can be carried away by the evaporating air stream 44. As shown in FIG. 3, the openings 34 are arranged on the floor 36 of the drip pan in rows and columns to provide a rectangular matrix of openings.

The concentrator 10 further includes an atmospheric air circulating system that is controlled by a blower or fan 40 located at the top of the tower 12 and an air inlet 42 located to the left side of the tower 12. The inlet 42 has a rain or weather hood 43 to protect the reservoir 24 from rain, sleet or snow. The blower 40 is designed to draw an air flow as shown by arrows 44 circulating below screen 16 and up though the tower and the labyrinth 20 and out the top of the tower 12. The blower outlet is preferably insulated to prevent freezing of condensate leaving the tower. The blower 40 maintains a negative static pressure at the top of the tower 12 of from 1 to 5 inches of water (25 mm to 127 mm of water). It should be understood that the fan pressure depends on the packing configuration and medium used. In FIG. 1 the operation of the blower or fan 40 may be controlled by temperature sensor 67 and humidity sensor 68. Because of the "anti-freeze" characteristic of glycol and water solution, it only becomes necessary to shut down operation of the concentrator 10 when temperature conditions drop below a predetermined temperature such as, for example, −35° C. and the solution in the concentrator starts to turn to slush. Thus, the temperature sensor 67 operates to shut down fan 40 when the temperature becomes too cold. The humidity sensor 68 shuts down the fan 40 when the relative humidity in the air is above a predetermined percentage such as, for example, 95%, since the inherent ability of the ambient air to absorb moisture is low. Otherwise, the concentrator of the present invention can operate 24 hours a day in conditions not sheltered from ambient weather conditions.

Below the concentrator 10 is a supply tank 46 containing a solution of dilute glycol having a water content of up to 95% by weight. This dilute glycol solution is supplied from the tank 46 to the reservoir 24 via supply pipes 48 and pump 50. Pump 50 is controlled by motor 52 and a float control switch 54 located in the reservoir 24 of the concentrator 10 to regulate the supply of dilute solution from tank 46 to reservoir 24.

Also located below the concentrator 10 is a holding tank 56 into which the concentrator 10 feeds a water and glycol solution having a water weight content of 40% to 60%. The concentrator 10 discharges the water and glycol solution to the holding tank 56 via piping 58. The flow of the solution is controlled by hydrometer 60 which preferably measures the specific gravity of the solution in reservoir 24 and sends a control signal via line 62 to normally closed solenoid valve 64. This signal opens solenoid valve 64 allowing solution 100 to drain from the reservoir 24 into the tank 56. The shut off valve 66 also regulates the flow of solution 100 from the reservoir 24 to holding tank 56 to a predetermined maximum flow rate. The shut off valve 66 also allows for maintenance of valve 64.

Those skilled in the art of mechanical design will recognize that the function of hydrometer specific gravity sensing device 60 and solenoid valve 64 acting in concert is to automatically transfer the glycol and water mixture from tank 24 to tank 56 as it is concentrated to the desired density by tower 14. In a practical embodiment, this function can be equally well performed by a simple motor driven domestic sump pump which in response to device 60 raises the water and glycol mixture out of tank 24 and allows it to run by gravity down into tank 56. If the discharge piping of this pump is vented so that it will not siphon liquid from tank 24 to tank 56, the system becomes fail safe in that it will shut down instead of flooding tank 56 with unconcentrated fluid should the pump, motor, or transmitting hydrometer fail. This discharge function becomes the mirror image of the feed function performed by pump 50 and level float switch 54.

Figure 2:
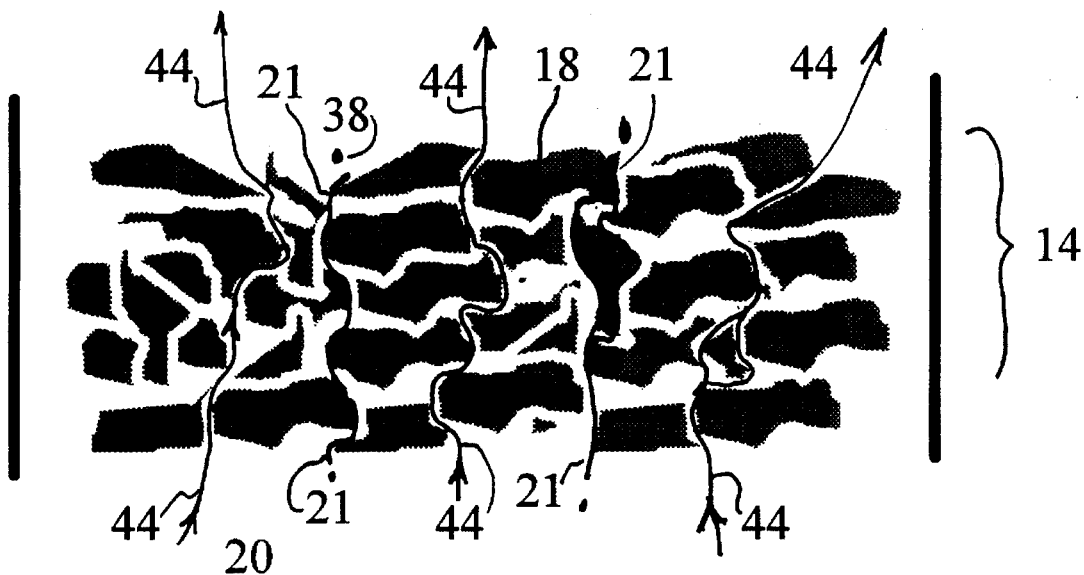
FIG. 2 is an enlarged diagrammatic view of a randomly packed glass shard configuration for a portion of the packing medium of the glycol concentrator; and, FIG. 3 is perspective view of the drip pan of the present invention.

The operation of the glycol concentrator 10 of the present invention with reference to FIGS. 1 to 3 will now be described.

The concentrator 10 as shown in FIG. 1 allows for a continuous process. The solution 100 in the reservoir 24 is processed by the concentrator 10 to reduce the water content and increase the glycol content. As the water content in solution 100 is reduced, the level of solution 100 in reservoir 24 drops causing float switch 54 to activate motor 52 and pump 50. Pump 50 supplies solution 110 from supply tank 46 along piping 48 and into reservoir 24. Solution in supply tank 110 is expected to have an initial water to glycol ratio typically in the range of 19:1 to 2:1. The concentration levels of water to glycol of solution 110 in supply tank 46 is dependent on the conditions under which the contaminated solution is collected.

Hydrometer 60 in reservoir 24 controls the draining of solution 100 from reservoir 24. When the specific gravity of solution 100 rises to a predetermined value representing a water to glycol ratio of 1:1 to 1:2, the hydrometer 60 sends a signal on line 62 to solenoid valve 64. This signal opens the solenoid valve 64 allowing solution 100 to drain into holding tank 56 at rate determined by manual shut off valve 58. Holding tank 56 accumulates solution 120 which will have a water to glycol ratio in the range of 1:1 to 1:2. The resultant concentration of water to glycol of solution 120 is dependent on the setting of hydrometer 60 which can be adjusted by the operator.

It should be understood that additional piping and valves will be present in supply tank 46 and holding tank 56 to respectively permit for the loading and removal of solution from these tanks. It should also be understood that separators and filters may be used to remove other contamination from the solution 110 prior to deposit in supply tank 46.

Solution 100 is circulated from the reservoir 24 to the packing medium 14 by pump 28 which supplies solution 100 to drip pan 32. Float switch 30 ensures the dip pan 32 does not overflow by turning on and off pump 28, or alternatively, modulating the pumping rate of pump 28. The openings 34 in the floor 36 of drip pan 32 causes discrete droplets 38 to be distributed over the packing medium 14. While the air flow 44 created by blower 40 draws air about the droplets 38 the droplets are of sufficient size not to be carried away by the air stream. The droplets 38 fall on the packing medium 18 and flow in thin streams 21 of solution down through the labyrinth 20.

The water content in solution 100 is reduced in concentrator 10 by what is believed to be a thin film evaporation process that occurs in the labyrinth 20 of the packing medium 14. The air and solution streams in practice pass over each other. It is believed that as the air passes over the thin streams or sheets of water and glycol on the extended surfaces of the labyrinth, the air selectively removes water from the mixture and progressively increases the concentration of glycol in the mixture. It can be demonstrated that the maximum removal rate of water occurs at a specific water glycol mixture flow rate for a given evaporating tower configuration and conditions. This coupled with the fact that it is most difficult to use known centrifuging art to separate water from glycol, suggest to the inventors that the success of this process depends upon a thin film evaporation process. It is believed that in the labyrinth the glycol water mixture is spread out over the packing medium at 1 or more molecules thick and the air stream selectively removes the water molecules leaving the glycol molecules and other impurities behind. Referring specifically to FIG. 2, the thin steams 21 are shown passing generally down through the labyrinth 20 of the packing medium 14. Air flow is shown by arrows 44 representing air flow generally up through the labyrinth 20. For the purpose of simplifying the illustration, only three air flow streams 44 and two solution streams 21 are illustrated.

It should be understood that the glycol concentrator of FIG. 1 is well adapted to operate in an outdoor environment. While supply tank 46 and holding tank 56 have been previously described as being located below concentrator 10, it should be clear from FIG. 1 that these tanks are located underground below frost line 130. This feature together with temperature sensor 67 and humidity sensor 68, which respectively shut down operation of concentrator 10 when temperature conditions fall below about −35° C. and the relative humidity is above about 95%, allow for an environmentally friendly concentrator able to operate unattended under most weather conditions.

An experimental model of the concentrator 10 was built and tested to determine the evaporation rate of the tower for different packing mediums 14 and to determine the energy consumption per liter of water evaporated. The packing materials tested were shards of glass (coarse broken glass), fine broken glass, and coarse and fine steel wool. The fan or blower 40 had a rating of 1/55 HP which translates to approximately 18 watts, assuming a small motor efficiency of 75%. The drip pan 32 had a length of 30.50 cm and a width of 23.75 cm. The drip pan had 81 holes of 1/32 of an inch diameter (0.79 mm) drilled therein in a 9 by 9 matrix grid. The packing medium 14 had approximately the same length and width dimensions as the drip pan and was packed to a depth of 19 cm. During the experiments no heat was introduced to the tower and the experiments were conducted at an ambient temperature of approximately 22° C. The operating results of the experimental concentrator are shown below in Table 1.

TABLE 1

| PACKING MEDIUM | SHARDS OF GLASS | FINE GLASS PARTICLES | COARSE AND FINE STEEL WOOL |
| --- | --- | --- | --- |
| Initial Glycol Concentration | 34 | 29% | 32% |
| Initial Specific Gravity of Solution | 1.046 | 1.038 | 1.043 |
| Final Glycol Concentration | 64% | 59% | 47% |
| Final Specific Gravity of Solution | 1.090 | 1.084 | 1.066 |
| Elapsed Hrs. | 32.5 | 53.0 | 26.7 |
| Average Water Removal Rate (Liters/Hour) | 0.1025 | 0.0752 | 0.0922 |
| Energy required to evaporate 1 liter of water | 0.230 kW-Hr | 0.314 kW-Hr | 0.256 kW-Hr |

Since it is known that the energy required to boil 1 liter of water to vapour is 540 Kilo Calories and that 1 kW-hr= 860 Kilo Calories, then 0.628 kW-Hr is required to distill 1 liter of water. Comparing this value with 0.230 kW-Hr required to remove a liter of water in the concentrator demonstrates that the concentrator is more energy efficient by a factor of 2.73.

From the above results it is apparent that the area of the packing tower and the depth of the tower will have to be considerably larger than the experimental model for commercial application. This may involve additional fans being used and the possibility of having a series of towers located one above the other.

We claim:

1. A glycol concentrator for increasing the concentration of glycol in a dilute solution of water and glycol having up to 95% water by weight, the glycol concentrator comprising:

a tower supporting a packing medium having a labyrinth;

a dilute glycol solution circulating system including a solution reservoir positioned below the packing medium, a drip pan having a floor and being supported above the packing medium, and circulating passage means running from the reservoir to the drip pan for supplying the dilute glycol solution from the reservoir to the drip pan, the drip pan having a plurality of openings in the floor through which discrete droplets of the dilute glycol solution are distributed over the packing medium to flow in thin streams downwardly in one direction through the labyrinth of the packing medium and into the reservoir;

an air circulating system for circulating air into the tower, through the labyrinth of the packing medium and out of the tower, the air passing over the thin streams of dilute glycol solution in the opposite direction to selectively remove water therefrom and increase the glycol concentration in the dilute glycol solution returning to the reservoir;

a solution inlet pipe for the reservoir and means for controlling the solution inlet pipe to introduce the dilute glycol solution having a ratio of water to glycol in the range of 19:1 to 2:1; and, a solution outlet pipe for said reservoir and means for controlling removal of the dilute glycol solution in the reservoir through the outlet pipe when the ratio of water to glycol of the dilute glycol solution in the reservoir is in the range of 1:1 to 1:2.

2. The glycol concentrator of claim 1 wherein the tower includes a supporting screen for supporting the packing medium.

3. The glycol concentrator of claim 2 wherein the air circulating system includes an air inlet adjacent the bottom of the packing tower such that air is drawn in under the supporting screen, through the screen and up through the packing medium.

4. The glycol concentrator of claim 3 wherein the air inlet includes a hood protection cover for keeping inclement weather out of the reservoir.

5. The glycol concentrator of claim 1 wherein the packing medium is selected from the group consisting of coarse glass, steel wool, and plastic.

6. The glycol concentrator of claim 1 wherein the solution circulating system includes a pump and motor for circulating solution from the reservoir to the drip pan.

7. The glycol concentrator of claim 6 wherein the solution circulating system includes a float switch located in the drip pan which controls the operation of the pump and motor to ensure that the drip pan is filled with a predetermined level of solution.

8. The glycol concentrator of claim 1 wherein the plurality of openings in the floor of the drip pan are further arranged in rows and columns to provide a matrix of openings to distribute the discrete droplets of dilute glycol solution over the packing medium.

9. The glycol concentrator of claim 1 wherein the air circulating system includes a fan system positioned at the top of the tower for creating a negative pressure at the top of the tower to draw air up through the labyrinth of the packing medium.

10. The glycol concentrator of claim 9 wherein the fan of the concentrator is insulated.

11. The glycol concentrator of claim 9 further includes a humidity sensor and a temperature sensor which respectively turn the fan off when the relative humidity is above a predetermined value and the ambient temperature is below a predetermined temperature.

12. The glycol concentrator of claim 1 wherein the means for controlling removal of dilute glycol solution further includes a hydrometer control means, for measuring the specific gravity of the dilute glycol solution in the reservoir.

13. The glycol concentrator of claim 1 wherein the concentrator is located above ground in an outside environment and further including a supply tank for feeding solution to the concentrator and a holding tank for receiving solution from the concentrator, the holding tank and supply tank being located underground below the frost line.

14. A method of removing water from a dilute solution of water and glycol having up to 95% water by weight, the method comprising the steps of:

controlling introduction through a solution inlet pipe to a reservoir of the dilute glycol solution having a ratio of water to glycol in the range of 19:1 to 2:1;

circulating the dilute glycol from the reservoir to a drip pan positioned above the reservoir, through a plurality of openings in a floor of the drip pan as discrete droplets distributed over a packing medium arranged to provide a labyrinth passing therethough, and through the packing medium in thin streams in one direction returning to the reservoir, circulating air in the opposite direction through the labyrinth of the packing medium over the thin streams of dilute glycol solution to selectively remove water therefrom and increase the glycol concentration in the dilute glycol solution returning to the reservoir; and, controlling removal through a solution outlet pipe for the reservoir of the dilute glycol solution in the reservoir when the ratio of water to glycol of the dilute glycol solution in the reservoir is in the range of 1:1 to 1:2.

15. The method of removing water from a solution of water and glycol as claimed in claim 14 wherein the air circulating through the packing medium is atmospheric air.

16. The method of claim 14 wherein the packing medium is selected from the group consisting of glass shards, coarse glass, plastic and steel wool.

* * * * *